(12) United States Patent
Norton et al.

(10) Patent No.: US 8,132,816 B2
(45) Date of Patent: Mar. 13, 2012

(54) ELECTRICALLY ACTUATED ROBOTIC TOOL CHANGER

(75) Inventors: Daniel Allen Norton, Cary, NC (US); Michael Joseph Hill, Fuquay-Varina, NC (US); Michael L. Gloden, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 1304 days.

(21) Appl. No.: 11/695,191

(22) Filed: Apr. 2, 2007

(65) Prior Publication Data

US 2007/0228670 A1 Oct. 4, 2007

Related U.S. Application Data

(60) Provisional application No. 60/789,005, filed on Apr. 4, 2006.

(51) Int. Cl.
*B23B 31/22* (2006.01)
(52) U.S. Cl. .......... 279/2.19; 279/2.23; 279/71; 279/73; 279/134; 279/140; 29/428; 403/322.2
(58) Field of Classification Search .................. 29/428; 279/2.19, 2.23, 71, 73, 81, 134, 140; 403/322.2; 439/348; *B23B 31/22*
See application file for complete search history.

(56) References Cited

U.S. PATENT DOCUMENTS

| 2,408,689 | A | * | 10/1946 | Seme John J | 33/573 |
|---|---|---|---|---|---|
| 3,822,951 | A | * | 7/1974 | Bornzin | 403/316 |
| 4,231,581 | A | * | 11/1980 | Benedict | 279/19.4 |
| 4,652,187 | A | * | 3/1987 | Regelsberger et al. | 408/240 |
| 4,696,524 | A | | 9/1987 | Cloyd | |
| 4,708,548 | A | * | 11/1987 | Taylor et al. | 409/234 |
| 4,775,269 | A | * | 10/1988 | Brix | 408/239 R |
| 5,211,501 | A | | 5/1993 | Nakamura et al. | |
| 5,219,318 | A | * | 6/1993 | Vranish | 483/16 |
| 6,375,378 | B1 | * | 4/2002 | Kitaura | 403/31 |
| 6,533,594 | B1 | * | 3/2003 | Kurup | 439/197 |
| 6,629,697 | B1 | * | 10/2003 | Asai et al. | 279/134 |
| 6,690,208 | B2 | * | 2/2004 | Gloden et al. | 307/326 |
| 7,252,453 | B1 | * | 8/2007 | Little | 403/322.2 |
| 7,779,716 | B2 | * | 8/2010 | Dellach et al. | 74/490.02 |
| 8,005,570 | B2 | * | 8/2011 | Gloden et al. | 700/245 |
| 2007/0228671 | A1 | * | 10/2007 | Norton | 279/2.11 |
| 2007/0235949 | A1 | * | 10/2007 | Gloden et al. | 279/2.12 |

OTHER PUBLICATIONS

Little, Robert. "Robot Arm Coupling Apparatus," Filed May 29, 2002, 19 pages, U.S. Appl. No. 10/157,581.
Gloden, Michael et al. "Robotic Tool Changer." Filed Mar. 14, 2006, 27 pages, U.S. Appl. No. 11/374,706.

* cited by examiner

*Primary Examiner* — Eric A Gates
(74) *Attorney, Agent, or Firm* — Coats & Bennett, P.L.L.C.

(57) ABSTRACT

A robotic tool changer comprises first and second units, operative to be separately attached to a robot and a robotic tool, and further operative to be selectively coupled together and decoupled. The first and second units are coupled and decoupled by an electric motor. Power from the electric motor may be applied to couple and decouple the first and second units in a variety of ways.

27 Claims, 15 Drawing Sheets

ELECTRICALLY ACTUATED ROBOTIC TOOL CHANGER

This application claims priority to U.S. provisional patent application Ser. No. 60/789,005 filed Apr. 4, 2006, and incorporated herein by reference in its entirety.

BACKGROUND

The present invention relates generally to the field of robotics and in particular to an electrically actuated robotic tool coupler.

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, the considerable cost of an industrial robot is amortized over a variety of tasks by providing different tools, or end effectors, that may be coupled to a general-purpose robotic arm. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot.

One half of the tool changer, called the master module, is permanently affixed to a robot arm. The other half, called the tool module, is affixed to each tool that the robot may utilize. Utilities such as electrical current, air pressure, hydraulic fluid, cooling water, and the like, are fed through cables and plumbing down the robot arm, that terminate at the master module. Similar cables and plumbing carry the utilities from the tool module to the particular tool. When the tool changer halves are mated, the utilities are transferred across the changer and made available at the tool. A tool changer thus provides a standard mechanical interface for physically coupling a variety of tools to a robotic arm, as well as providing for the transfer of utilities. Utility and safety concerns dictate that the physical coupling between master and tool modules of a robotic tool changer be robust and secure, even in the face of a power outage or loss of a utility such as pneumatic pressure.

The use of rolling members, urged by a piston against an inclined surface, to lock the master and tool modules together is known in the art. For example, U.S. Pat. No. 4,696,524 (incorporated herein by reference) discloses a plurality of ball members contained within the master module, and circumferentially arranged around a central axis. Extending from the master module, along this axis, is a piston member having an inclined surface operative to contact the ball members and urge them outwardly as the piston advances axially. The ball members contact a surface in the tool module disposed at an angle such that outward force induced on the ball members by the piston generates an "upward" force component that presses the angled surface, and thus the entire tool module, against the master module.

U.S. Pat. No. 5,211,501 (incorporated herein by reference) discloses a similar piston and ball member arrangement, with an improved piston/ball member contact surface. This patent discloses a multifaceted contact surface comprising an initial tapered contact surface for first contacting the ball members and moving them outward and into contact with an angled surface of the tool module. A flat—i.e., parallel with the piston axis—failsafe surface is adjacent the initial tapered surface. A tapered locking surface, at an angle with respect to the axis of less than that of the initial actuating surface, is adjacent the failsafe surface.

For the following discussion, assume the master module is oriented over the tool module, with the interface plane between the two horizontally oriented. As the piston member advances axially (downwardly) into the tool module, the initial contact surface contacts the ball members and moves them radially outward (horizontally) into the tool module. At the extent of the piston's axial movement, the final tapered surface presses each ball member outwardly against an angled surface in the tool module. This angled surface tapers inwardly, toward the piston axis, as it approaches the master module. Each ball member, urged outwardly by the tapered locking surface of the piston member, presses against the tool module angled surface with a resultant force that can be decomposed into horizontal (outward) and vertical (upward) components. The vertical component of force presses the tool module upward and locks the tool module to the master module.

The ball members press inwardly against the piston with equal and opposite force. Since the tapered locking surface is angled with respect to the piston axis, the force exerted by each ball member is a resultant force that can also be decomposed into horizontal (inward) and vertical (upward) components. In the event of a loss of force actuating the piston, the vertical component of force exerted by the ball members urges the piston upwardly. As the piston moves upwardly, the balls are free to move inwardly, pressing with less force on the tool module angled surface and tending to decouple the master and tool modules. For safety, a failsafe surface is interposed between the piston initial contact surface and the tapered locking surface, both of which are tapered. The cylindrical failsafe surface is vertical—i.e., parallel with the piston axis. During a power loss, force exerted by the ball members may move the piston slightly upwards, until the ball members contact the failsafe surface. Since the failsafe surface is vertical, the resultant force exerted by the ball members is normal, i.e., horizontal, and includes no vertical component. This prevents force from the balls on the piston from further retracting the piston into the master module and further decoupling the modules, without some positive actuation of the piston in that direction. Accordingly, the tool module remains coupled to the master module when piston actuating power is lost.

Pending patent application Ser. No. 10/157,581 (incorporated herein by reference) discloses a similar piston and ball member arrangement, with a piston member contact surface having a tapered locking surface at an angle with respect to the axis greater than that of the initial actuating surface.

Pending patent application Ser. No. 11/374,706 (incorporated herein by reference) discloses a similar piston and ball member arrangement, with a piston member contact surface having a failsafe surface that includes a lip, or protrusion, which actively opposes retracting motion of the piston. When the master and tool modules are coupled together—that is, when the ball members are fully extended by the tapered locking surface and pressing against the tool module angled surface—the protrusion on the failsafe surface is past (below) the ball members. In the event of loss of piston actuating power, the force exerted by the ball members on the tapered locking surface tends to decouple the master and tool modules, as described above. This tendency is neutralized by the failsafe surface being parallel to the piston axis, thus not supporting any component of force in the axial direction. The protrusion provides an additional assurance that the piston cannot retract into the master module. Moving the protrusion past the ball members requires a positive retracting force on the piston, since the balls must momentarily be pressed yet further against the tool module angled surface for the protrusion to pass. The protrusion may comprise a raised surface, or the lip of a depression in the failsafe surface into which the ball members nestle.

In all of the above examples, the piston is actuated by pneumatic pressure. Pneumatic pressure is a simple, reliable and inexpensive source of power for actuating mechanisms such as robotic tool couplers. However, in many deployed applications, such as on a factory floor, a system for generating and distributing compressed air to multiple robot arms is expensive, cumbersome, prone to outages, and costly to maintain. Accordingly, a robotic tool coupling system that does not depend on a source of supplied pneumatic pressure to operate would be advantageous.

SUMMARY

According to one or more embodiments disclosed and claimed herein, a robotic tool changer comprises first and second units, operative to be separately attached to a robot and a robotic tool, and further operative to be selectively coupled together and decoupled. The first and second units are coupled and decoupled by an electric motor. Power from the electric motor may be applied to couple and decouple the first and second units in a variety of ways.

One embodiment relates to a robotic tool changer. The tool changer includes a first unit operative to be attached to one of a robot and a robotic tool and a second unit operative to be attached to the other of the robot and a robotic tool, and further operative to be selectively coupled to and decoupled from the first unit. The tool changer also includes a coupling mechanism disposed in the first unit and operative to selectively couple the first and second units in a coupled position and to allow the first and second units to decouple in a decoupled position. The tool changer further includes an electric motor operative to drive the coupling mechanism between coupled and decoupled positions.

Another embodiment relates to a robotic tool changer. The tool changer includes a tool unit operative to attach to a robotic tool and including a generally circular chamber and a master unit operative to attach to a robot, and to selectively couple to and decouple from the tool unit. The tool changer also includes an annular collar on the master unit, having a plurality of holes formed therethrough, and a plurality of ball members disposed within the holes. The tool changer further includes a piston having at least one tapered surface disposed in the master unit, the piston operative to urge the ball members radially outward of the collar as the piston moves from a retracted, decoupled position to an extended, coupled position. The tool changer still further includes an electric motor and a coupling mechanism operative to selectively move the piston between decoupled and coupled positions in response to the electric motor. The tool unit chamber includes an angled surface opposite each collar hole when the master and tool units are abutted, the angled surface operative to direct a component of the force applied to it by the ball members towards the master unit.

Yet another embodiment relates to a method of selectively coupling two robotic tool coupler units. The two units are abutted, and an electric motor is actuated to couple the two units together.

Still another embodiment relates to a robotic tool changer. The tool changer includes a tool unit operative to attach to a robotic tool and including a generally circular chamber and a master unit operative to attach to a robot, and to selectively couple to and decouple from the tool unit. The tool changer also includes a locking shaft connected to the master unit and protruding therefrom. The locking shaft has a plurality of thread ledge lobes disposed radially around the shaft, each thread ledge lobe comprising a plurality of thread ledges arranged in an axial orientation on the locking shaft. The tool changer further includes an electric motor disposed on the master unit and operative to selectively rotate the locking shaft. The tool unit chamber includes a plurality of thread shelf sets disposed radially around an interior annular surface thereof. Each thread shelf set comprises a plurality of thread shelves arranged in an axial orientation. When the master and tool units are abutted, the locking shaft extends within the tool unit chamber with the thread ledge lobes in spaces between the thread shelf sets in a decoupled position. When the electric motor rotates the locking shaft to a coupled position, the thread ledges engage and lock with corresponding thread shelves, coupling the master and tool units together.

Still another embodiment relates to a robotic tool changer. The tool changer includes a first unit operative to be attached to one of a robot and a robotic tool and a second unit operative to be attached to the other of the robot and a robotic tool, and further operative to be selectively coupled to and decoupled from the first unit. The tool changer also includes an electric motor and means for selectively coupling the first and second units in a coupled position and to allow the first and second units to decouple in a decoupled position under the power of the electric motor.

DETAILED DESCRIPTION

According to various embodiments of the present invention, the coupling of master and tool modules of a robotic tool changer of the piston/ball member type is achieved via electric actuation of the piston to displace the ball members. That is, the piston is driven axially by an electric motor.

Figure 1:
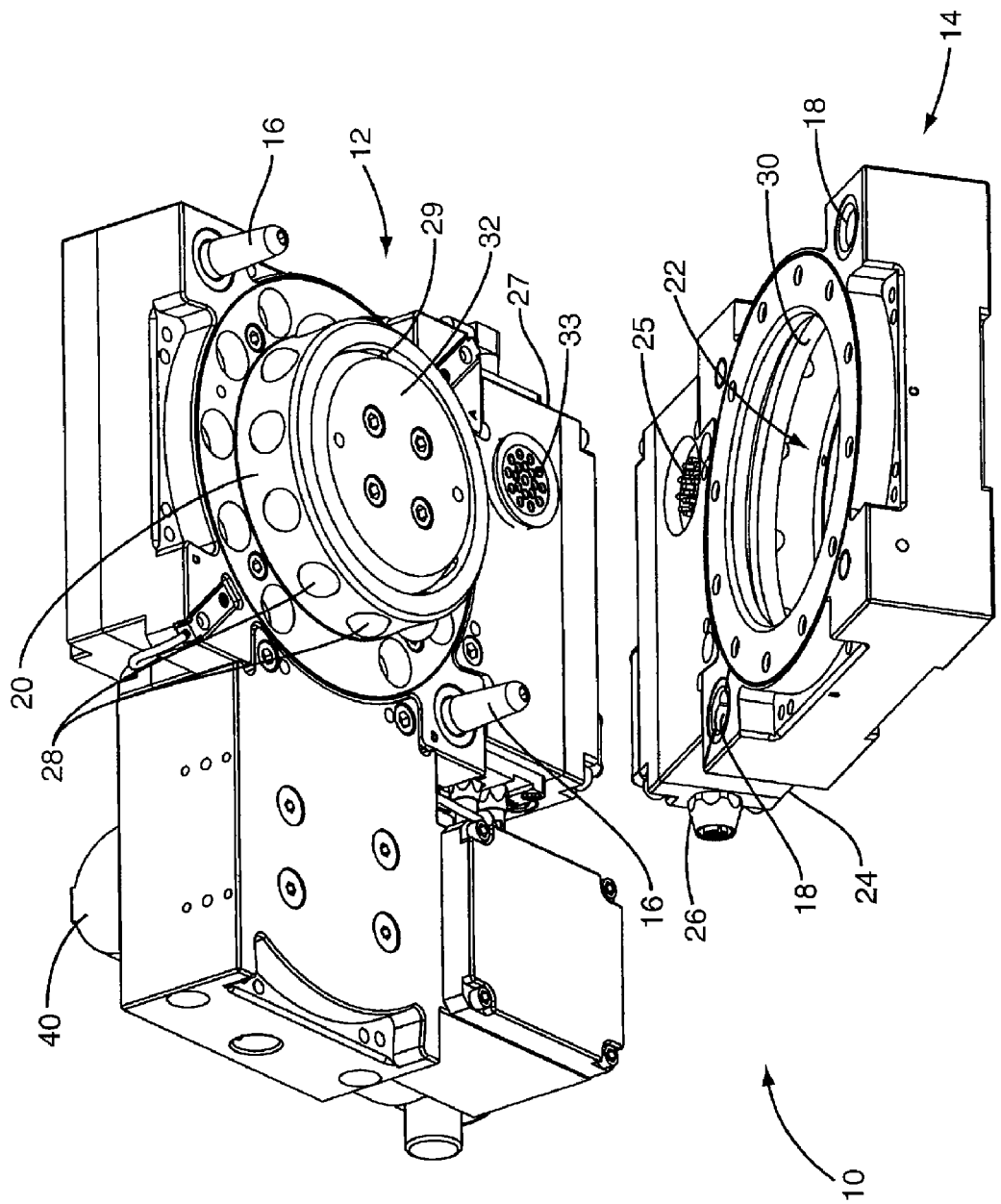
FIG. 1 is a perspective rendering of a robotic tool changer with an electrical signal utility module attached.
Figure 2:
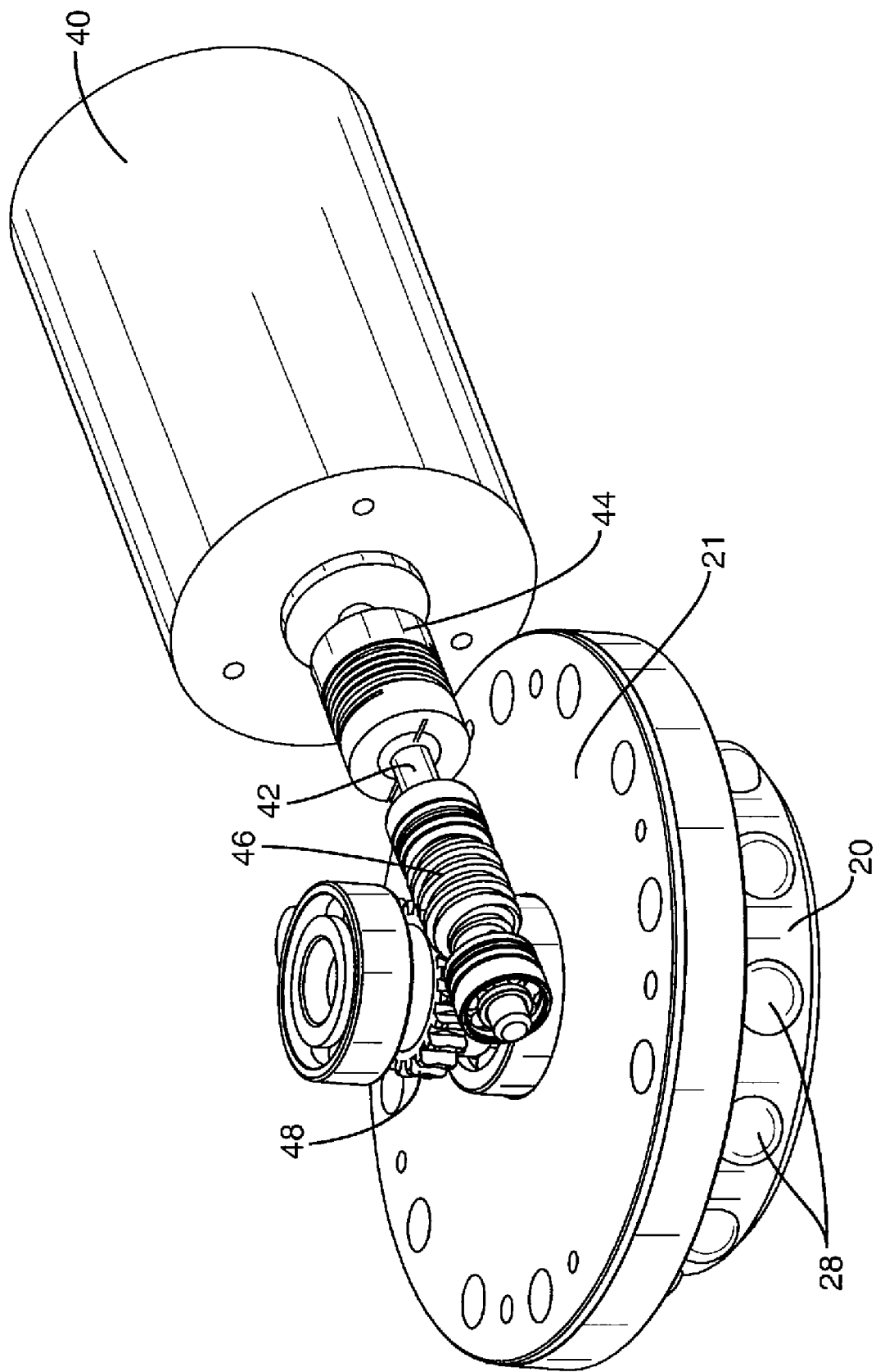
FIG. 2 is a perspective rendering of a motor, drive train, and worm gear arrangement of selected components of a robotic tool changer master module.
Figure 3:
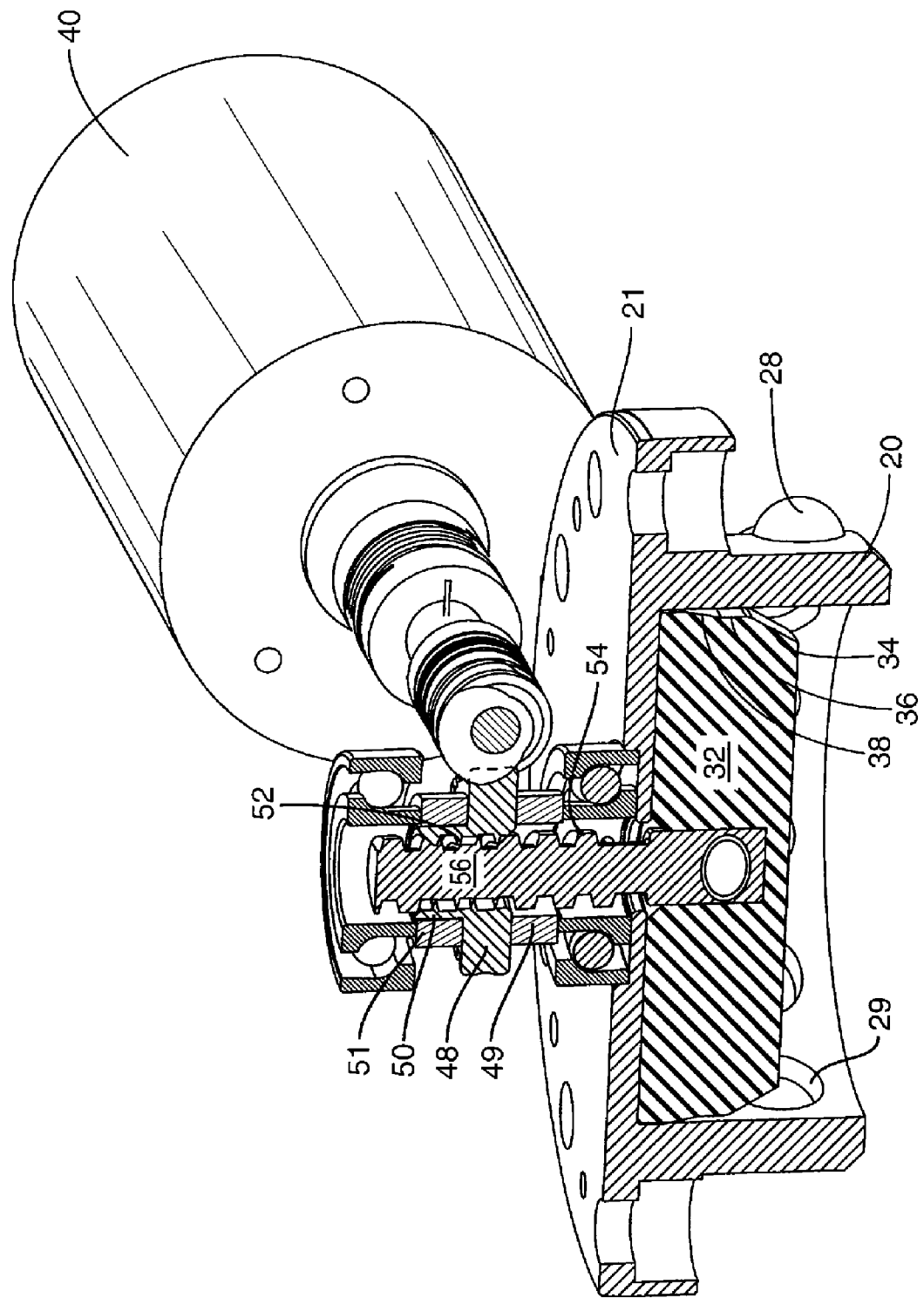
FIG. 3 is a partial sectional diagram of the worm gear drive train of a robotic tool changer master module.

FIG. 1 depicts a robotic tool changer, indicated generally by the numeral 10, according to one embodiment of the present invention (also depicted in FIGS. 2 and 3). The robotic tool changer 10 comprises a master module 12 adapted to be connected to a robotic arm (not shown) and a tool module 14, adapted to be connected to a robotic tool (not shown). The robotic tool changer 10 allows users to selectively attach different tools to a robotic arm by selectively coupling and decoupling the master module 12 and the tool module 14.

In the embodiment depicted in FIG. 1, alignment pins 16 on the master module 12 are inserted into alignment holes 18 formed in the tool module 14, to assist in achieving proper alignment between the master module 12 and the tool module 14 during the coupling process.

In various embodiments, the tool changer 10 may provide for the passing of various utilities, such as electrical power, pneumatic gas, fluids, data signals, and the like, between a robotic arm and a robotic tool. For example, FIG. 1 depicts a tool electrical signal module 24 affixed to the tool module 14. The tool electrical signal module 24 includes male electrical contacts 25, connected internally to one or more connectors 26. A master electrical signal module 27 is affixed to the master module 12. The master electrical signal module 27 includes female electrical contacts 33 adapted and disposed to mate with the male electrical contacts 25 when the master and tool modules 12,14 are coupled together. The female electrical contacts 33 are connected internally to one or more connectors (not shown). Electrical signals may flow, for example, from a connection the robot arm (not shown) via female electrical contacts 33 to male electrical contacts 25 when the master and tool modules 12, 14 are coupled together, and thence from connector 26 to an attached tool. Signals in the opposite direction may follow a reverse path.

To couple the master and tool modules, 12, 14 together, a collar 20 protruding from the surface of the master module 12 is inserted into a central chamber 22 formed in the tool module 14. A piston 32 is then actuated to move outwardly from the master module 12 along the central axis of the collar 20, in the direction of the tool module 14. As the piston 32 passes through the central region of the collar 20, actuating surfaces thereof contact a plurality of ball members 28, urging the ball members 28 outwardly through holes 29 formed in the collar 20. The ball members contact an angled surface 30 in the tool module 14, forcing the tool module 14 in an upward direction, locking it to the master module 12 as described above.

The actuating surfaces of the piston 32 are most clearly depicted in FIG. 3, and comprise an initial actuating surface 34, a failsafe surface 36, and a tapered locking surface 38. As the piston 32 advances axially within the collar 20 in the direction of the tool module 14, the initial actuating surface 34, angled with respect to the axis of the piston, initially contacts the ball members 28, urging them radially outward as the piston 32 advances axially. A failsafe surface 36, parallel with the axis of the piston 32, prevents force exerted by the ball members 28 on the piston 32 from moving the piston 32 in the direction of the master module 12, and thus decoupling the master and tool modules 12, 14. A tapered locking surface 38 urges the ball members 28 fully outwardly in a radial direction, exerting the maximum force against the angled surface 30 in the tool module 14 and locking the tool module 14 to the master module 12.

When the master and tool modules 12, 14 are decoupled and the collar 20 removed from the chamber 22, the ball members 28 are retained within holes 29 by virtue of the outer diameter of the hole 29 (that is, the diameter of the hole 29 at the outer surface of the collar 20) being slightly smaller than the diameter of the ball members 28. As depicted in FIG. 3, the ball members 28 are retained on the inner side of the collar 20 by the piston 32.

In some applications, it is advantageous to actuate the piston 32 by electrical power. FIG. 2 depicts an electrical motor 40 and an arrangement of gears operative to actuate the piston 32 to couple and decouple the master and tool modules 12, 14. FIG. 2 depicts only the collar 20 and accompanying cap 21 of the master module 12, along with the motor 40 and gear train, for clarity.

The electric motor 40 selectively drives a shaft 42, coupled to the motor 40 output shaft by a shaft coupling mechanism 44. Attached to the shaft 42 are worm threads 46. The worm threads 46 engage with a worm gear 48, transferring the rotational motion of the shaft 42 into rotational motion of the worm gear 48 at approximately 90°.

As depicted in the partial sectional view of FIG. 3, the worm gear 48 includes an annular collar 50 having threads 52 formed in the interior surface thereof. The threads 52 engage with screw threads 54 of a piston shaft 56 connected to the piston 32. Annular spacers 49, 51 maintain the worm gear 48 in a fixed axial position with respect to the piston 32 (i.e., a fixed vertical position as depicted in FIG. 3). Consequently, when the worm gear 48 is driven rotationally by the worm threads 46 on the shaft 42, the piston shaft 56 is actuated in an axial (vertical) direction by the interaction of worm gear internal threads 52 and shaft external threads 54.

The piston shaft 56 is affixed to the piston 32. As the piston 32 advances axially through the collar 20 towards the tool module 14 (downwardly, as depicted in FIG. 3), the initial actuating surface 34 engages the ball members 28, displacing them radially outward. Further movement of the piston 32 brings the tapered locking surface 38 into contact with the ball members 28, forcing them outwardly and into firm contact with the angled surface 30 of the tool module 14, locking the tool module 14 against the master module 12.

To decouple the master and tool modules 12, 14, the motor 40 is driven in the opposite direction. In similar manner, the shaft 42 rotates the worm threads 46, rotating the worm gear 48 about the piston shaft 56. Because the position of the worm gear 48 in the axial direction is fixed, the interaction of worm gear internal threads 52 and piston shaft threads 54 retracts the piston shaft 52, and hence the piston 32, away from the tool module 14 and into the collar 20. This allows the ball members 28 to disengage from the angled surface 30 of the tool module 14, moving into the interior of the collar 20 of the master module 12, and allowing the master and tool modules 12, 14 to fully decouple.

Figure 4:
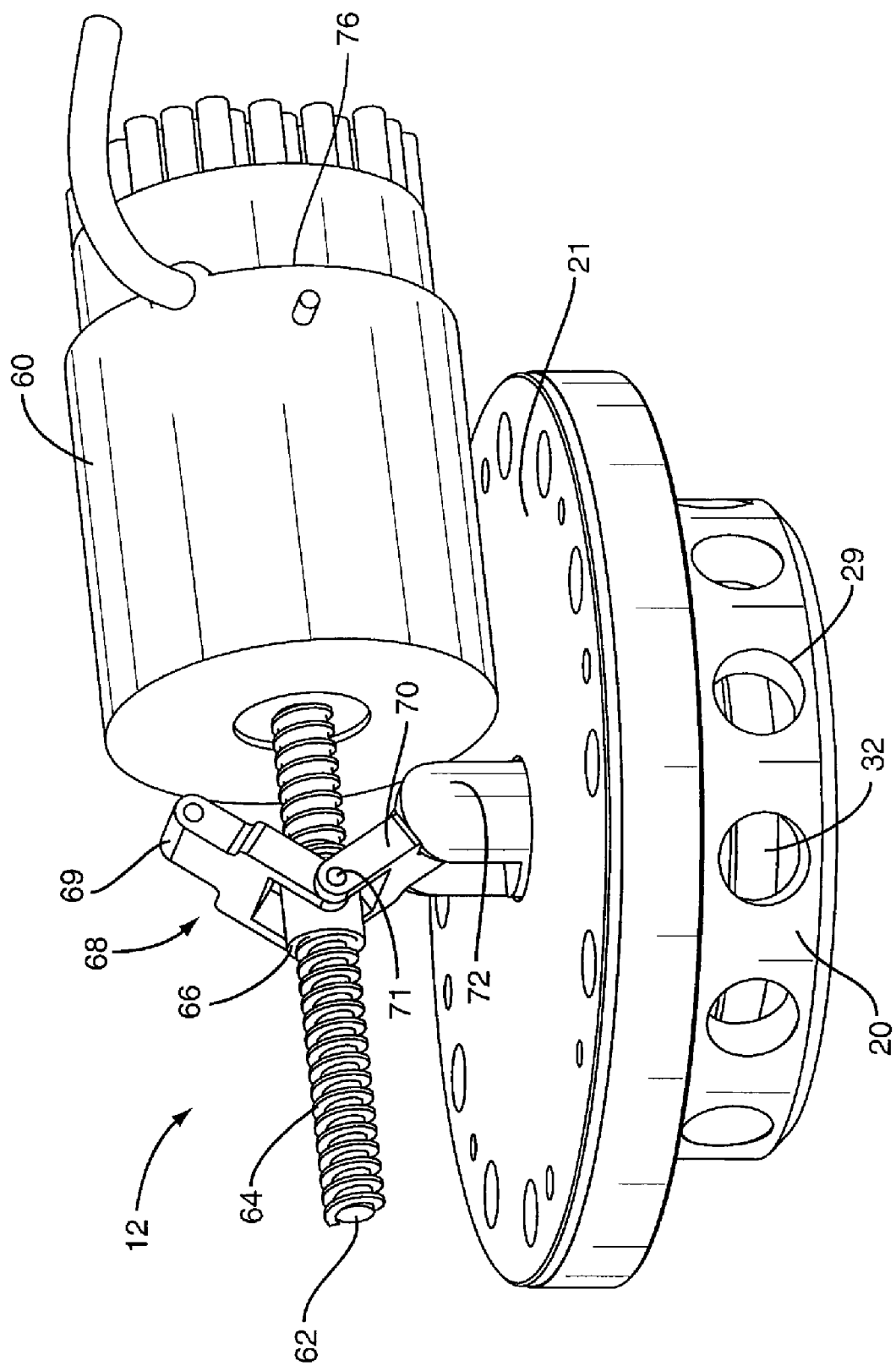
FIG. 4 is a perspective rendering of a motor, drive train, and scissor gear arrangement of selected components of a robotic tool changer master module.

FIG. 4 depicts another embodiment of an electrically actuated master unit 12 of a tool changer 10. In this embodiment, a shaft 62, driven by an electric motor 60, includes screw threads 64 formed along a substantial length thereof. Threaded onto the shaft 62 is a nut 66 having interior threads that mate to the screw threads 64. The nut 66 is connected to a scissors linkage 68, comprising upper and lower portions 69, 70, pivotally connected to each other and the nut 66 at pivot pin 71. The lower portion 70 of the scissors linkage 68 is pivotally connected to a housing 72, which in turn is connected to the piston 32 disposed within the collar 20 of the master unit 12 (only the collar 20, collar cap 21, motor 60 and gear train of the master module 12 are depicted in FIG. 4 for clarity).

The connection of the lower portion 70 of the scissors linkage 68 to both the nut 66 and the bracket 72 prevents the nut 66 from rotating as the shaft 62 rotates. Accordingly, when the motor 60 drives the shaft 62—such as in a clockwise direction in the embodiment depicted in FIG. 4—the action of the threads 64 and the interior threads of the nut 66 drive the nut 66 down the shaft 62, towards the motor 60. This moves the lower portion 70 of the scissors linkage 68 from the angled position depicted in FIG. 4 to a more vertical position over the bracket 72. Since the motor 60, and consequently the shaft 62, are rigidly fixed, this movement of the lower portion 70 of the scissors linkage 68 forces the bracket 72, and hence the attached piston 32, in an axial direction (downward, as depicted in FIG. 4). This axial movement of the piston 32 towards the tool module 14 displaces the ball members 28 (not shown in FIG. 4) outwardly to engage the angled surface 30 of the tool module 14, as previously described.

Rotation of the shaft 62 by the motor 60 in a counterclockwise direction has the opposite effect. That is, the nut 66 moves along the shaft 62 in a direction away from the motor 60, displacing the lower portion 70 of the scissors linkage 68 into an angled orientation, thus pulling the bracket 72, and hence the attached piston 32, in an axial direction (upwardly, as depicted in FIG. 4), releasing pressure on the ball members 28 and decoupling the master and tool units 12, 14. The motor may be attached to the master unit 12 in a broad variety of ways, as known in the art.

In axially displacing the piston bracket 72 by altering the relative angle of the lower portion 70 of the scissors linkage 68, the embodiment of the master unit 12 depicted in FIG. 4 may induce positive and negative radial forces aligned along the direction of the shaft 62 on the bracket 72 and consequently on the piston 32. These forces may tend to exert uneven forces on the ball members 38 arrayed around the piston 32. The side forces may additionally promote wear on the piston 38 and inner surface of the collar 20 in the radial positions aligned with the shaft 62.

Figure 5:
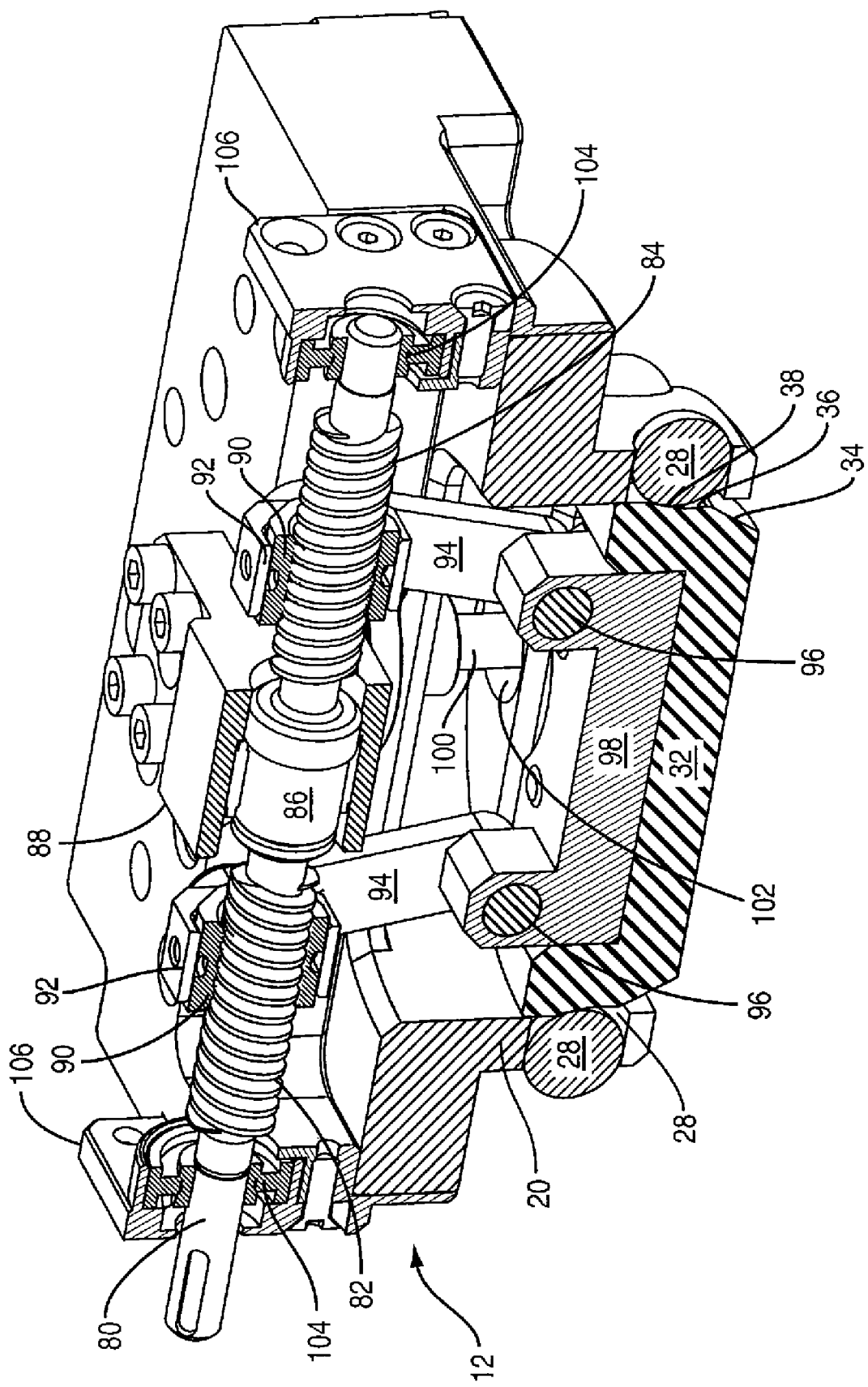
FIG. 5 is a partial sectional diagram of an oppositely-threaded shaft and trunnion nut drive train of a robotic tool changer master module.
Figure 6:
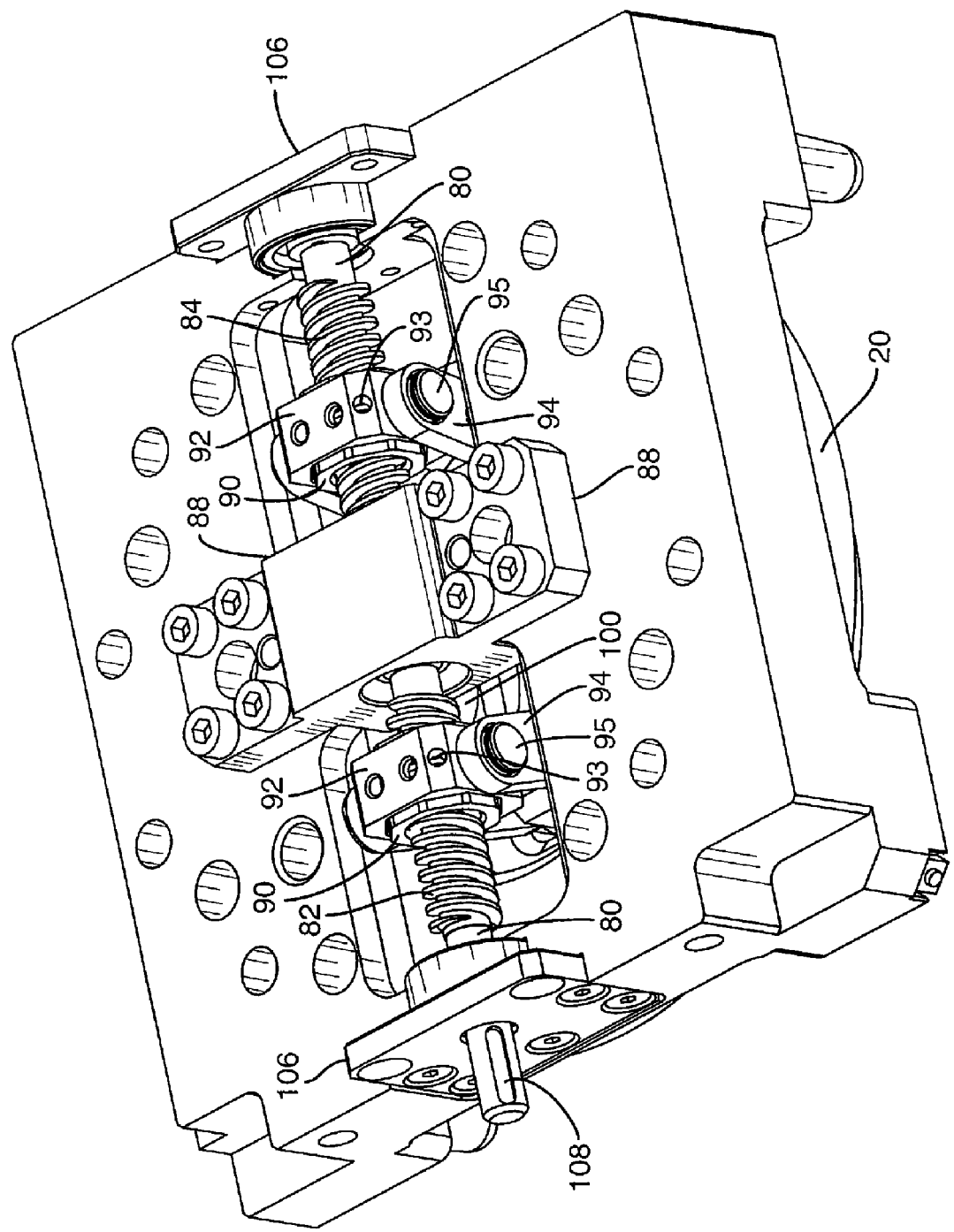
FIG. 6 is a perspective rendering of selected components of the trunnion nut drive train of FIG. 5.

FIGS. 5 and 6 depict another embodiment of the present invention that utilizes an electrically driven shaft and pivoting linkage to actuate the piston 32 in an axial direction. In this embodiment, a shaft 80 is driven by an electric motor (not shown). The shaft 80 includes oppositely oriented ACME threads 82 and 84. That is, if the threads 82 are right-handed, then the threads 84 are left-handed, and vice versa. A needle bearing 86, disposed between the screw threads 82 and 84, secures the shaft 80 against a shaft clamping bracket 88.

Trunnion nuts 90, each having internal threads matched to the respective ACME threads 82, 84, are threaded onto opposite sides of the shaft 80. The trunnion nuts 90 are enclosed by trunnion outer sleeves 92. The trunnion nuts 90 are secured within the trunnion outer sleeves 92 by set screws (not shown) disposed in threaded holes 93 (FIG. 6). The trunnion outer sleeves 92 have an inner geometry matching the outer geometry of the trunnion nuts 90, such as octagonal. Accordingly, the trunnion outer sleeves 92 prevent rotation of the nuts 90 as the shaft 80 rotates. Consequently, interaction between the screw threads 82, 84 and the corresponding internal threads of the trunnion nuts 90 cause the trunnion nuts 90 to move laterally—both towards the center or each toward opposite ends of the shaft 80—as the shaft 80 rotates. The trunnion outer sleeves 92 are secured to pivoting linkages 94 at pivot points 95 (FIG. 6). The pivoting linkages 94 are secured at the opposite ends thereof by pivot points 96 to a piston mounting bracket 98, which is secured to the piston 32.

As the shaft 80 rotates, the trunnion nuts 90 and trunnion outer sleeves 92 travel along screw threads 82, 84 towards either the center of the shaft 80 or towards opposite ends of the shaft 80, depending on the direction of shaft 80 rotation. This displacement moves the upper portion of each pivoting linkage 94, causing each pivoting linkage 94 to alter its angle of displacement relative to the axis of the piston 32. In so doing, the piston 32 is actuated axially towards the tool module 14 (downwardly as depicted in FIG. 5), coupling the master and tool modules 12, 14 together when the trunnion nuts 90 are moved towards the center of the shaft 80 by shaft 80 rotation. Correspondingly, when the shaft 80 rotates in the opposite direction, moving the trunnion nuts 90 toward opposite ends of the shaft 80, the angle of each pivoting linkage 94 with respect to the axis of the piston 32 is increased, thus axially actuating the piston 32 away from the tool module 14 (upwardly in the orientation depicted in FIG. 5), and decoupling the master module 12 from the tool module 14.

An alignment shaft 100, disposed in an alignment hole 102 formed within the piston 32, ensures that the motion of the piston 32 is restricted to an axial direction. That is, the alignment shaft 100 prevents any rotation of the piston 32 about its axis. Bearings 104, disposed within end caps 106, along with needle bearing 86, maintain the orientation of the shaft 80 and provide for the free rotation thereof. A keyway 108 (FIG. 6), formed in a protruding end of the shaft 80, allows for attachment to an electrical motor (not shown), to provide torque to rotate the shaft 80.

Figure 7:
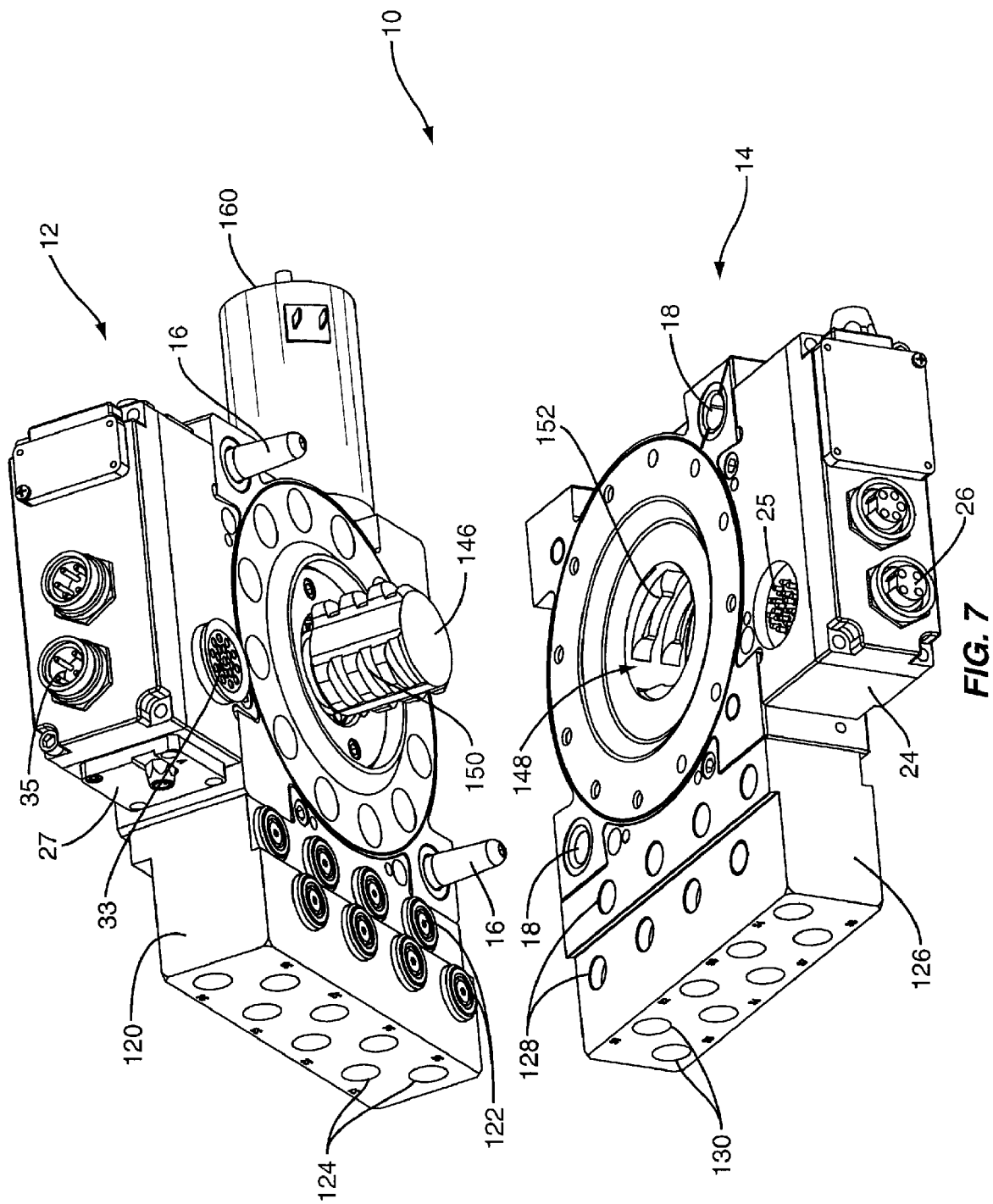
FIG. 7 is a perspective rendering of a robotic tool changer with electrical signal and pneumatic utility modules attached.

FIGS. 7-10 depict another embodiment of an electrically actuated tool changer 10. FIG. 7 depicts a master module 12 and a tool module 14. Master electrical signal module 27 and tool electrical signal module 24 provide for the passage of electrical signals between a robotic arm and a robotic tool, as previously described.

The tool changer 10 of FIG. 7 additionally depicts a master pneumatic module 120, having self-sealing pneumatic ports 122, each in communication with respective external pneumatic ports 124, affixed to the master module 12. A tool pneumatic module 126, having pneumatic ports 128 and connected to respective external pneumatic ports 130, is affixed to the tool module 14. The master and tool pneumatic modules 120, 126 allow for the passage of compressed pneumatic fluid from a robotic arm to a robotic tool. In general any embodiment of a tool changer 10 disclosed herein may include utility passing modules such as electrical signal modules 27, 24, pneumatic modules 120, 126, or other utility passing modules, as known in the art.

Alignment pins 16 on the master module 12 mate with alignment holes 18 on the tool module 14, to ensure proper alignment of the master and tool modules 12, 14 when the units are coupled together.

The master tool module 12 depicted in FIG. 7 includes a locking shaft 146 protruding therefrom, in the direction of the tool module 14. The locking shaft 146 includes a plurality of thread ledges 150, arranged in an axial orientation to form thread ledge lobes, with a plurality of such lobes disposed radially around the shaft 146. To couple the master and tool modules 12,14 together, the locking shaft 146 is disposed within a cavity 148 formed in the tool module 14. A plurality of thread shelves 152 are axially arranged to form a thread shelf set, and a plurality of such sets are disposed radially around the interior annular surface of the cavity 148. When coupling and decoupling the master and tool modules 12, 14, the locking shaft 146 extends into the cavity 148, with each lobe of thread ledges 150 fitting between sets of thread shelves 152. Correspondingly, the sets of thread shelves 152 are aligned with the portions of locking shaft 146 between the lobes of thread ledges 150. Once the master and tool modules are positioned abutting, the locking shaft 146 is rotated by electric motor 160 causing the thread lobes 150 to engage with the thread shelves 152 to lock the master and tool modules 12, 14 together.

Figure 8:
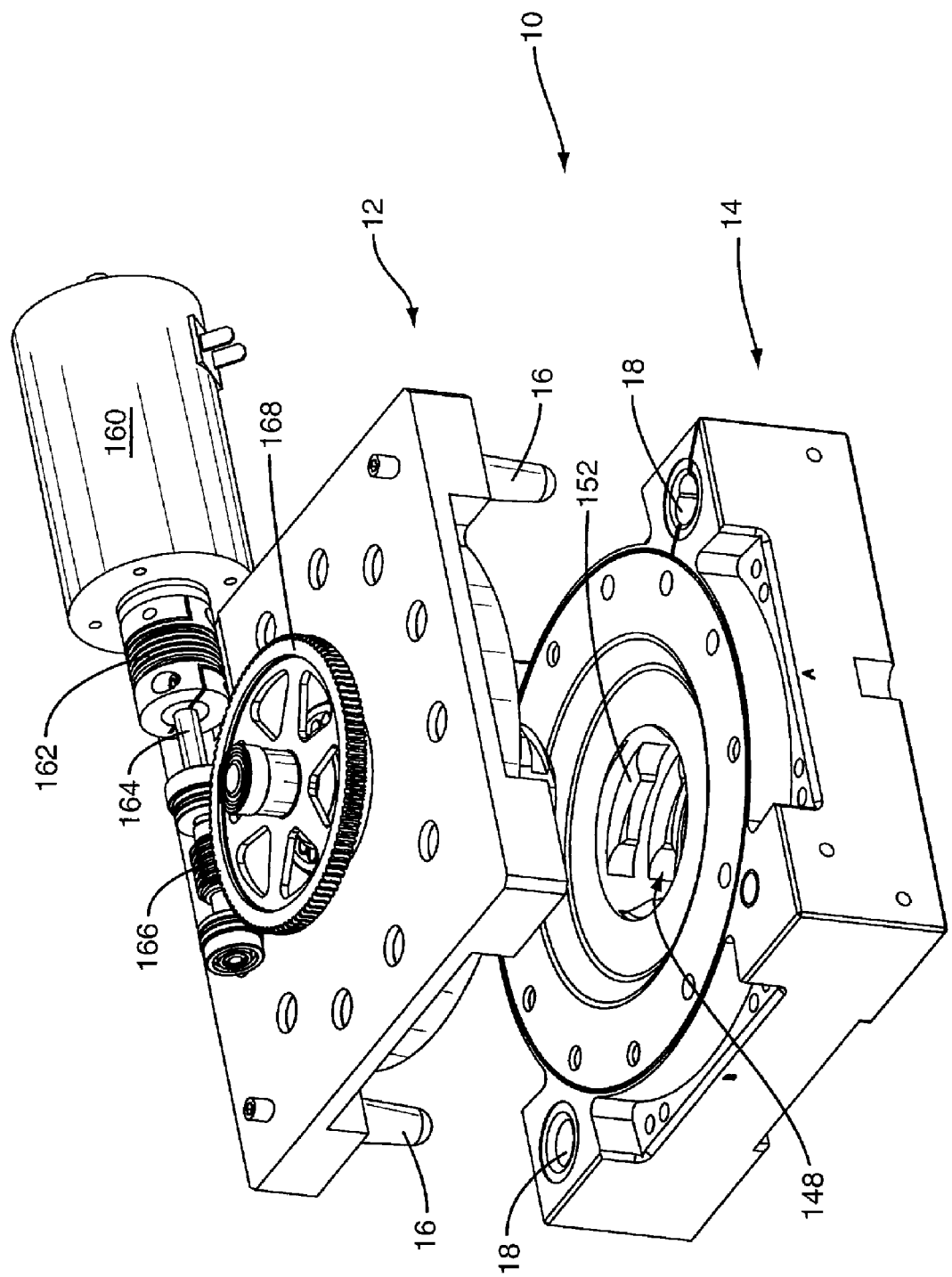
FIG. 8 is a perspective rendering of a robotic tool changer with a translucent housing depicting a motor coupling and worm drive train.

FIG. 8 depicts selected portions of the master and tool modules 12, 14, to show the gear train connecting the motor 160 to the locking shaft 146. An output shaft of the motor 160 is coupled to a shaft 164 by a shaft coupling mechanism 162.

Disposed on the shaft 164 are worm threads 166. The worm threads 166 engage a worm gear 168, operative to translate rotation of the shaft 164 into rotation of the worm gear 168 at approximately 90°.

Figure 9:
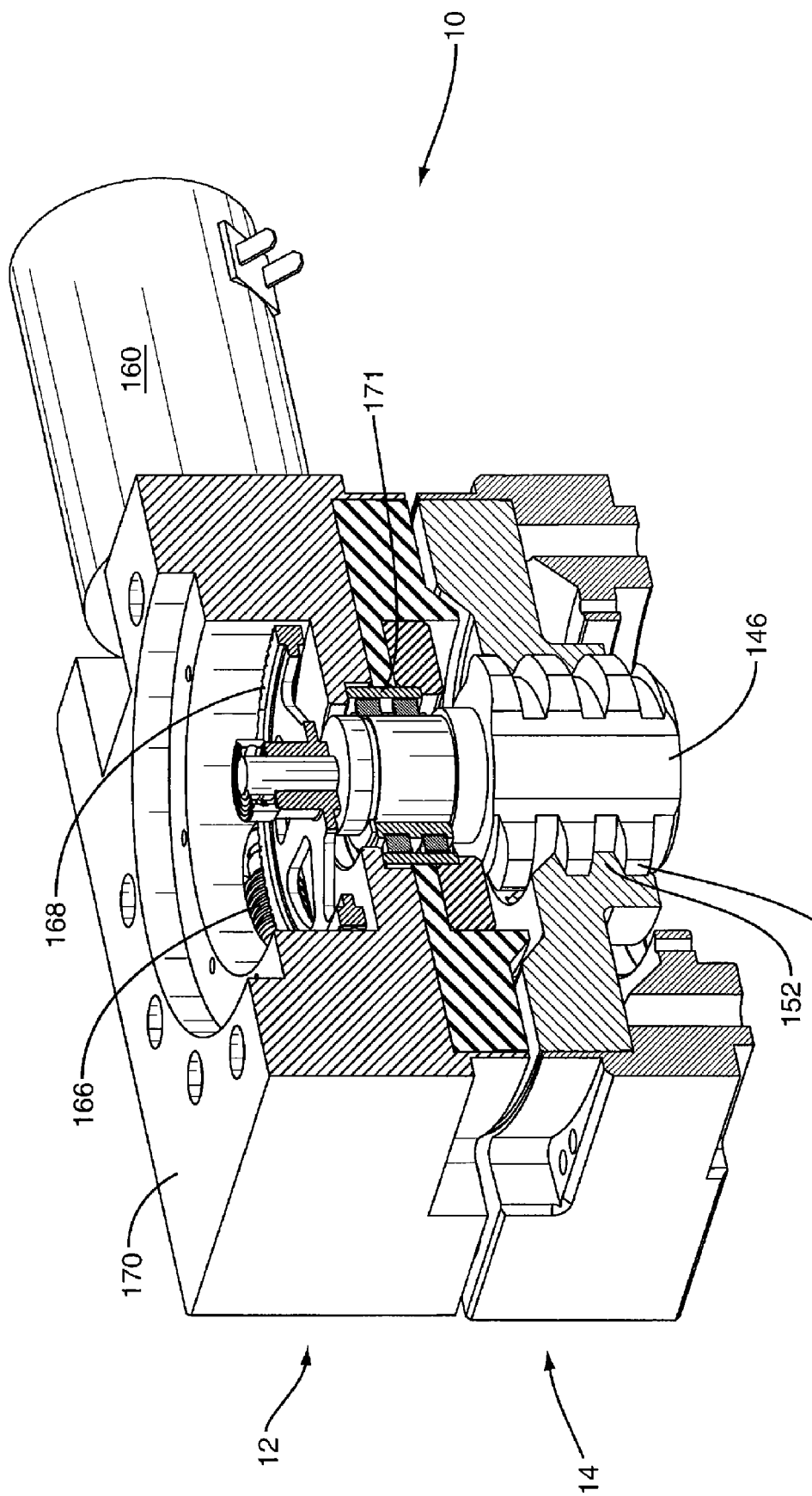
FIG. 9 is a partial sectional view of a robotic tool changer with an electrically actuated locking shaft.

FIG. 9 depicts a perspective view of the locking shaft 146, and a sectional view of selected components of the tool changer 10. The thread ledges 150 on the locking shaft 146 and the thread shelves 152 within the chamber 148 are engaged—a condition achieved only after at least partial rotation of the locking shaft 146 after the master and tool modules 12, 14 have been brought together.

Figure 10:
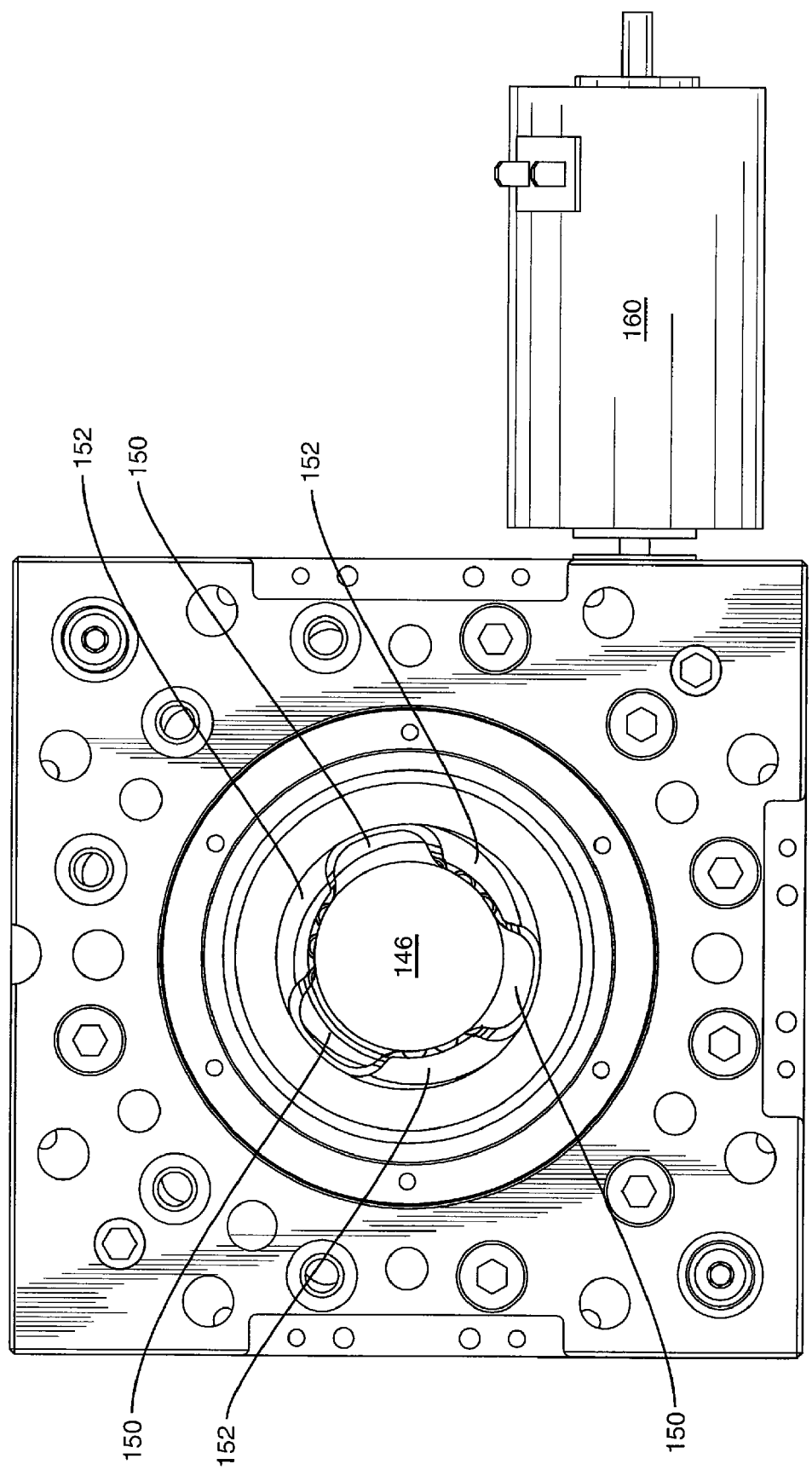
FIG. 10 is a plan view of a robotic tool changer in a mated but not coupled position.

FIG. 10 depicts the master and tool modules 12, 14 mated together, but prior to coupling by rotation of the locking shaft 146. The view of FIG. 10 is from beneath the tool module 14, as it is depicted in FIGS. 7, 8 and 9. The locking shaft 146 includes, in this embodiment, three lobes of axially aligned thread ledges 150, evenly disposed radially around the locking shaft 146. The locking shaft 146 is oriented such that each axially aligned lobe of thread ledges 150 fit in an axial space formed within the cavity 148 between corresponding sets of thread shelves 152. In this position, the master and tool modules 12, 14 may be separated.

To couple the master and tool modules 12,14 together, the locking shaft 146 is inserted into the chamber 148, assuming the position depicted in FIG. 10. The locking shaft 146 is then rotated, to cooperatively engage the thread ledges 150 and thread shelves 152, as depicted in FIG. 9. As depicted in FIGS. 7-10 and as appreciated by those of skill in the art, the thread ledges 150 and corresponding thread shelves 152 both include a slope, or deviation from a horizontal orientation (where horizontal is defined as perpendicular to the axis of the locking shaft 146). The degree and orientation of this inclination is such that when the locking shaft 146 is rotated through a sufficient angle to engage the thread ledges 150 with the thread shelves 152, a force sufficient to lock the master and tool modules 12, 14 together is generated and maintained.

To decouple the master and tool modules 12, 14, the locking shaft 146 is rotated from a locked position where the thread ledges 150 and thread shelves 152 are engaged, to an unlocked position—depicted in FIG. 10—wherein the thread ledges 150 and the thread shelves 152 are completely disengaged. The master module 12 may then be moved away from the tool module 14.

Figure 11:
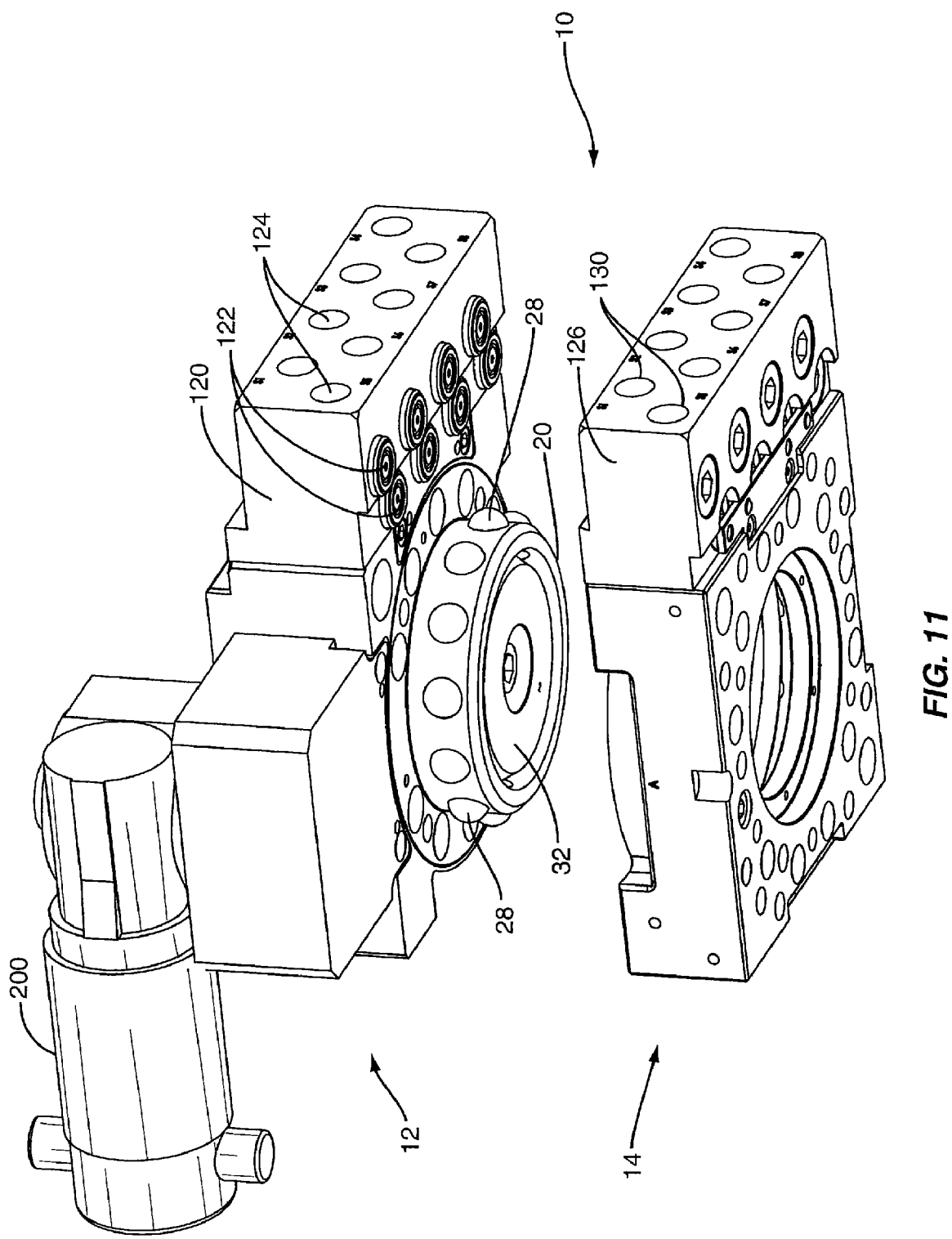
FIG. 11 is a perspective rendering of a robotic tool changer with a pneumatic utility module attached.

FIGS. 11-15 depict an electrically actuated tool changer according to another embodiment of the present invention, wherein the piston 32 is driven axially to couple and decouple the master and tool modules 12,14 via a variable helix cam groove 210 formed in a piston shaft 209. FIG. 11 depicts the tool changer 10 with pneumatic utilities modules 120, 126 attached to the master and tool modules 12, 14 as previously discussed.

Figure 12:
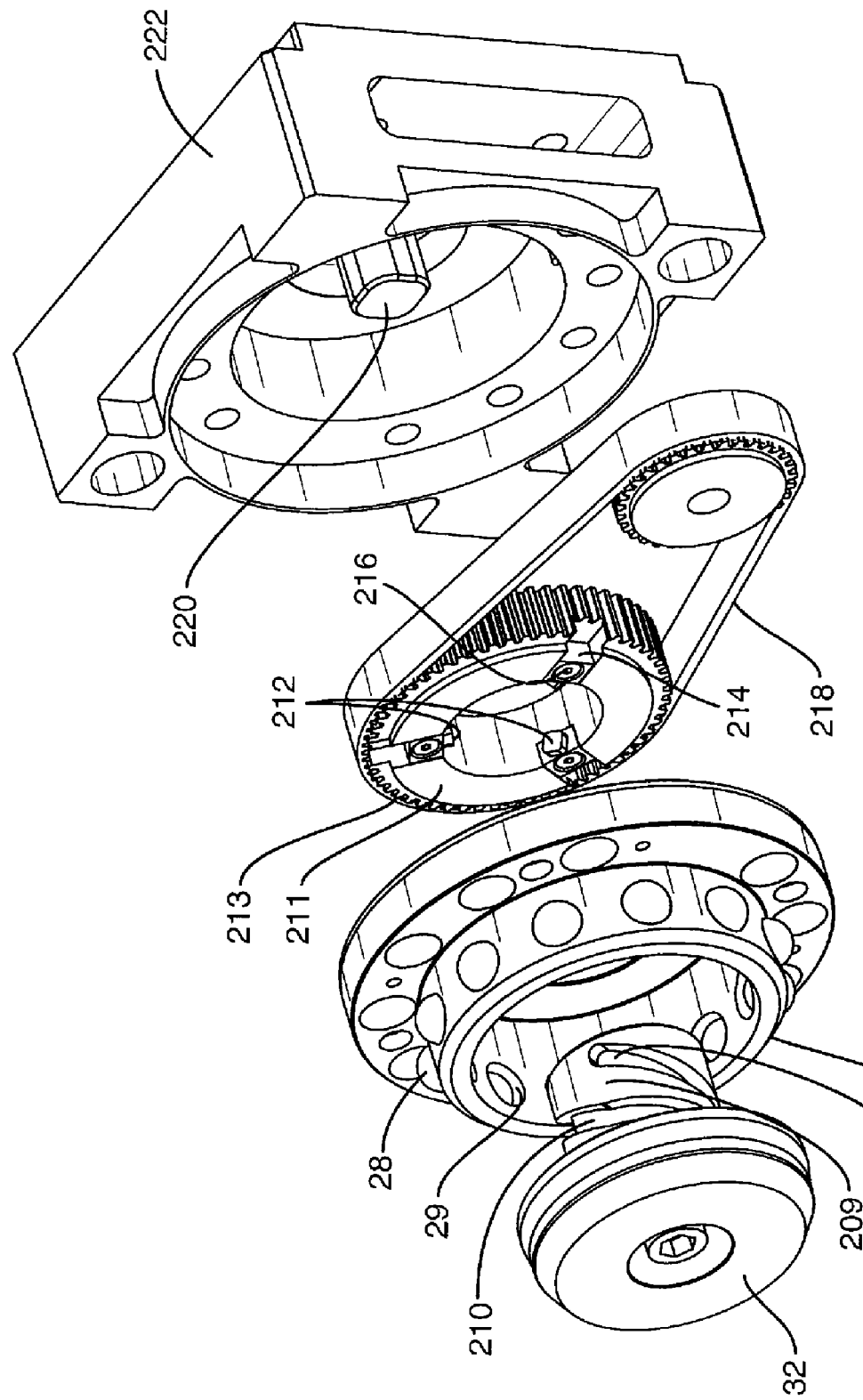
FIG. 12 is an exploded perspective rendering of selected components of a robotic tool changer master module.

FIG. 12 is an exploded perspective view of relevant portions of the master module 12. The piston 32 is rigidly affixed to a piston shaft 209. Formed within the piston shaft 209 are one or more variable helix cam grooves 210. The piston 32 is disposed within a collar 20, the collar 20 carrying ball members 28 disposed within holes 29 arrayed radially around the circumference thereof. The master and tool modules 12, 14 couple together by angled surfaces of the piston 32 engaging ball members 28 and moving them radially outward, contacting an angled surface 30 within the tool module 14, as discussed extensively herein.

The piston shaft 209 is disposed within the bore of a driven gear 211, having gear teeth 213 formed around the periphery thereof. Disposed within the driven gear 211, and extending into the interior bore thereof, are one or more cam followers 212. Each cam follower 212 is connected to a cam follower block 214, which is affixed to the driven cam 211 by a fastener 216.

A spline post 220, having a non-circular cross section (a generally square cross section in the embodiment depicted in FIGS. 11-15) is non-rotationally affixed to a housing 222 of the master module 12. The spline post 220 is disposed within a central bore of the piston shaft 209 having a matching cross section, to prevent rotation of the piston shaft 209 as it moves in an axial direction.

Figure 13:
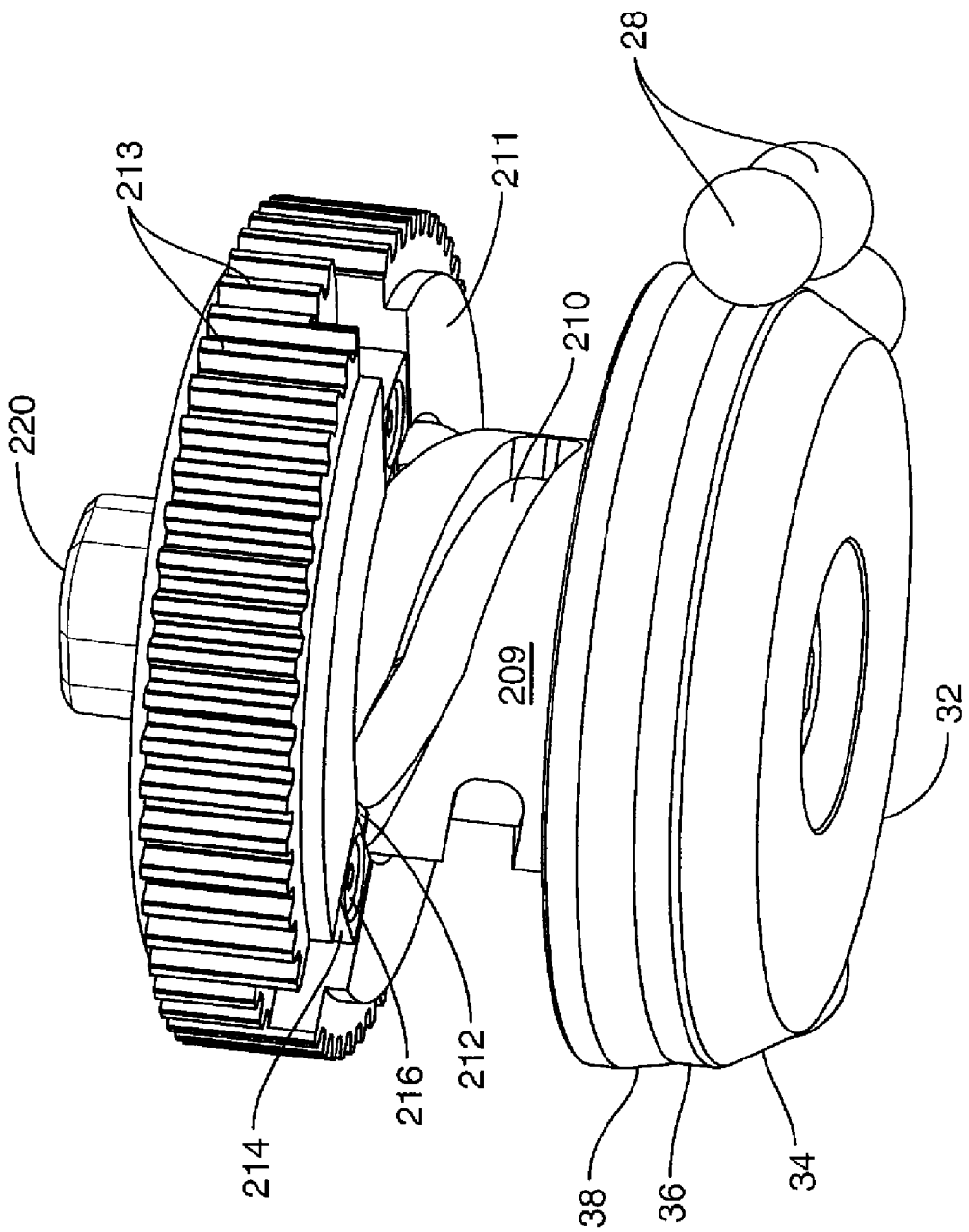
FIG. 13 is a perspective rendering of selected components of a robotic tool changer master module.

FIG. 13 depicts the piston 32, piston shaft 209, spline post 220, and driven gear 211 in an assembled configuration. Cam followers 212 are disposed within variable helix cam grooves 210 formed in the piston shaft 209. As the driven gear 211 is rotated, the cam followers 212, interacting with the variable helix cam grooves 210, cause the piston shaft 209, and hence the piston 32, to move in an axial direction (vertically, as depicted in FIG. 13). The spline post 220 prevents the piston shaft 209 from rotating, thus translating the rotational motion of the driven gear 211 into axial motion via interaction between the cam followers 212 and variable helix cam grooves 210.

Figure 14:
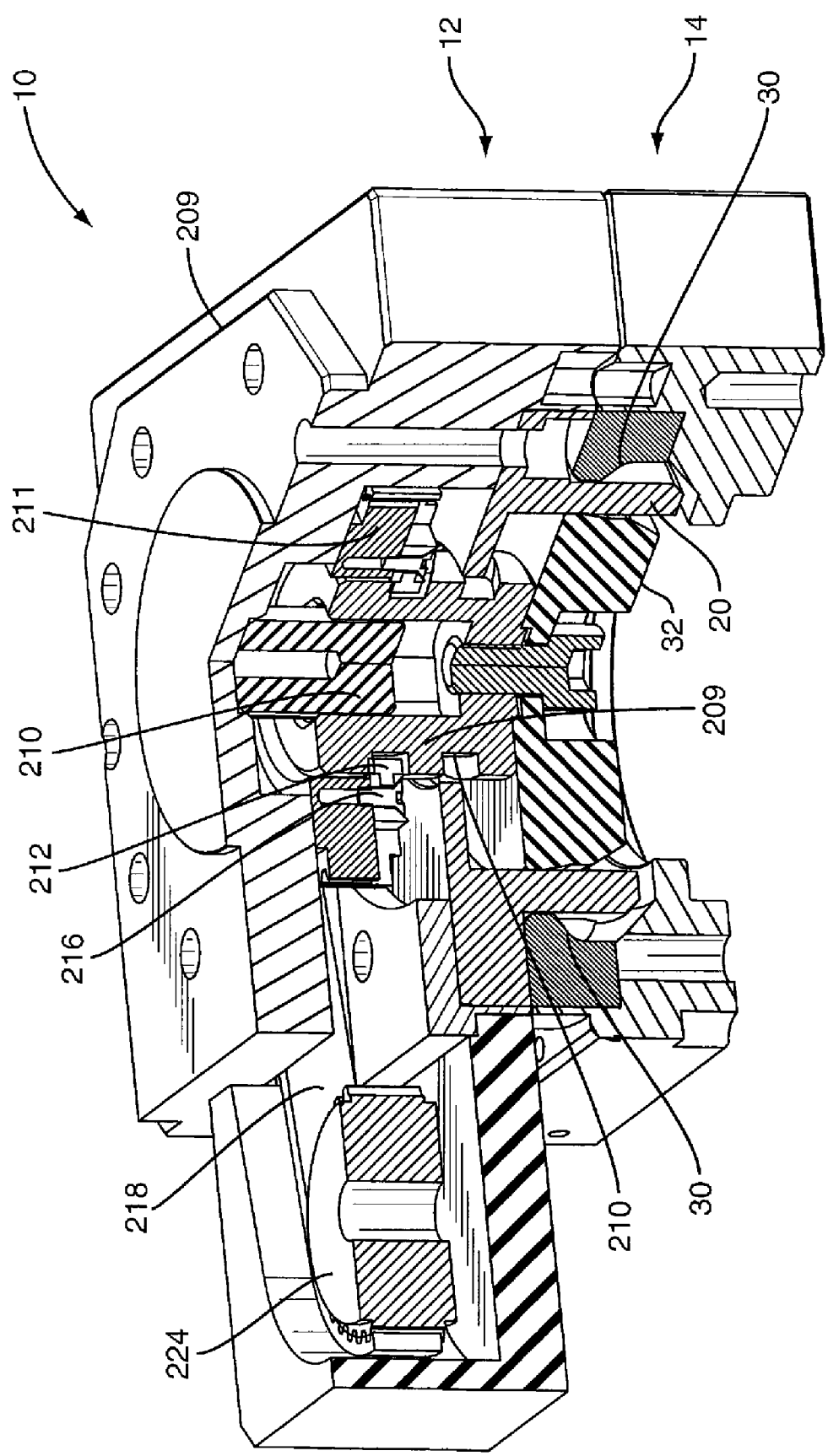
FIG. 14 is a sectional view of selected portions of the robotic tool changer of FIG. 11 in a coupled position.

FIG. 14 depicts a sectional view of the tool changer 10, depicting the interaction of the various components thereof. In this embodiment, the driven gear 211 is driven, via a belt 218, by a driving gear 224. Those of skill in the art will readily recognize that the drive train comprising the driving gear 224 and belt 218 is only one of many possible ways of driving the driven gear 211. For example, the driven gear 211 may be driven directly, such as by engaging the gear teeth 213 thereon with corresponding teeth of mechanical gears.

Note the angled surfaces 30 of the tool module 14 depicted in FIG. 14. When ball members 28 are urged outwardly from the collar 20 by axial movement of the piston 32, the ball members contact the angled surfaces 30. Further radially applied force, such as is exerted when the angled locking surface 38 of the piston 32 (see FIG. 13) contacts the ball members 28, presses the ball members 28 against the angled surface 30. The upward component of this force (in the orientation depicted if FIG. 14) presses the tool module 14 against the master module 12, thus locking the master and tool modules 12, 14 together.

Figure 15:
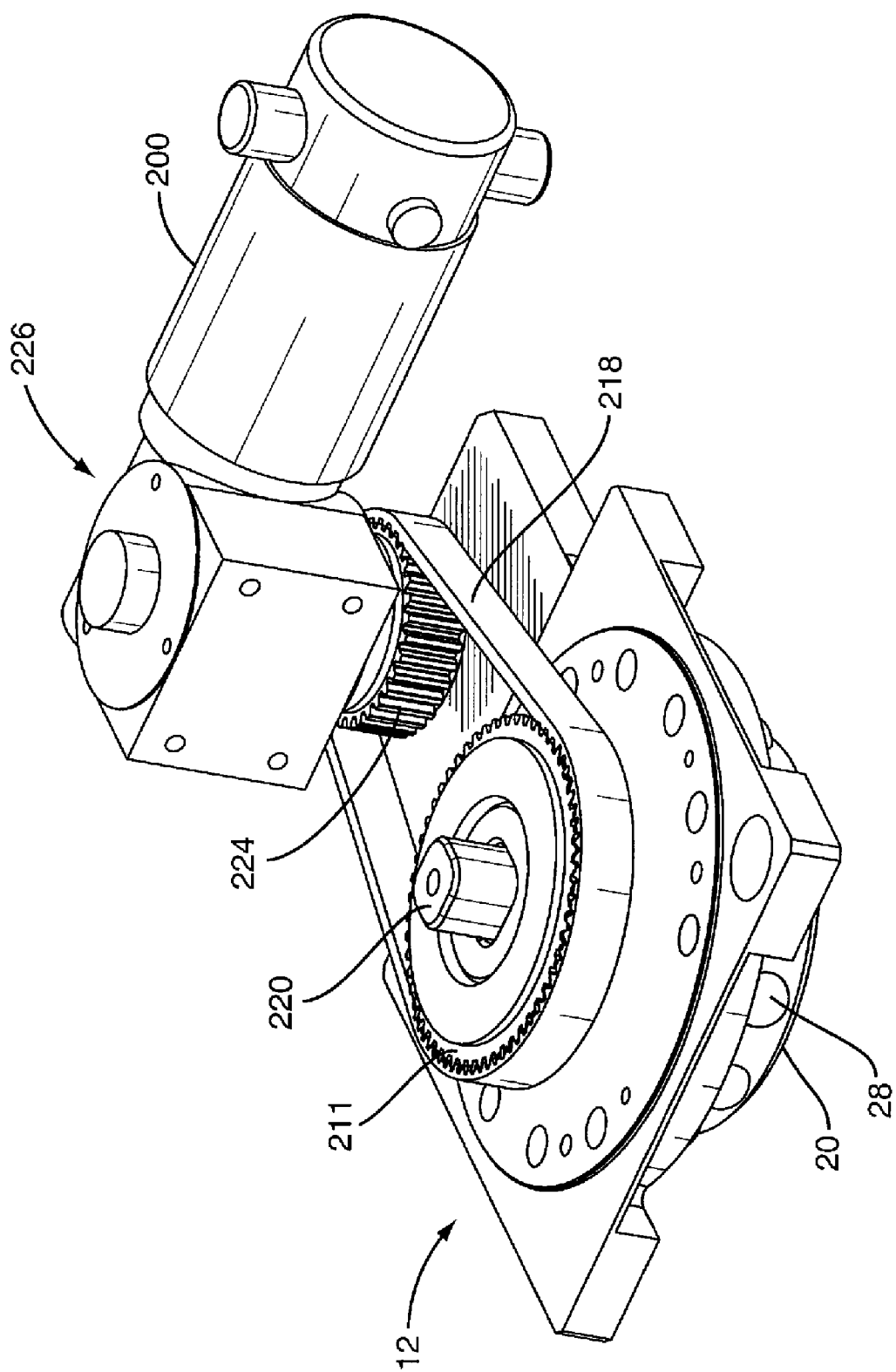
FIG. 15 is a perspective rendering of a robotic tool changer being driven by an electric motor.

FIG. 15 depicts a view of the master module 12 showing an electric motor 200 driving the driven gear 224 via a gear train assembly 226. The gear train assembly 226 may, for example, comprise a worm gear assembly similar to that disclosed above.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A robotic tool changer, comprising:
a first unit operative to be attached to one of a robot and a robotic tool;
a second unit operative to be attached to the other of the robot and a robotic tool, and further operative to be selectively coupled to and decoupled from the first unit;
a coupling mechanism at least partially protruding from the first unit along a first axis and operative to engage within a recess in the second unit and to selectively couple the first and second units in a coupled position and to allow the first and second units to decouple in a decoupled position, and
an electric motor operative to drive the coupling mechanism between coupled and decoupled positions;

wherein the electric motor is coupled to the coupling mechanism by a rotating shaft disposed along a second axis perpendicular to the first axis.

2. The tool changer of claim 1 wherein the coupling mechanism comprises:
   a plurality of rolling members disposed in the one of the units;
   a piston disposed in the first unit, the piston selectively movable longitudinally along the first axis between a retracted, decoupled position and an extended, coupled position, the piston having at least one tapered surface operative to displace the rolling members outwardly of the piston axis as the piston moves from the decoupled to the coupled position; and
   at least one angled surface in the second unit operative to lock the first and second units together when the rolling members are forced against the angled surface by a tapered piston surface.

3. The tool changer of claim 2 wherein the rolling members are disposed generally circumferentially around the piston axis.

4. The tool changer of claim 3 wherein the rolling members are operative to roll in a generally radial direction with respect to the piston axis.

5. The tool changer of claim 4 wherein the rolling members comprise balls.

6. The tool changer of claim 2 wherein the at least one tapered surface comprises:
   a tapered locking surface;
   an initial actuating surface; and
   a failsafe surface interposed between said tapered locking surface and said initial actuating surface.

7. The tool changer of claim 6 wherein the initial actuating surface has an angle with respect to the piston axis not greater than the angle of the tapered locking surface.

8. The tool changer of claim 6 wherein the initial actuating surface has an angle with respect to the piston axis equal to or greater than the angle of the tapered locking surface.

9. The tool changer of claim 2 wherein the rotating shaft couples the electric motor to the piston and is operative to move the piston between a retracted, decoupled position and an extended, coupled position.

10. The tool changer of claim 9 wherein the rotating shaft is connected to the electric motor, and includes worm threads, and further comprising:
    a worm gear disposed coaxially with the piston and having a threaded inner surface, the worm gear coupled to the rotating shaft worm threads; and
    a threaded shaft connected to the piston, the threaded shaft coupled to the threaded inner surface of the worm gear.

11. The tool changer of claim 10 wherein the worm gear is constrained in the first axial direction and imparts an axial force on the threaded shaft via the threaded inner surface as it is turned by the worm threads of the rotating shaft.

12. The tool changer of claim 9 wherein the rotating shaft is threaded and is connected to the electric motor, and further comprising:
    a threaded nut threaded onto the threaded rotating shaft; and
    a scissors linkage connected to the threaded nut and operative to displace the piston between a retracted, decoupled position and an extended, coupled position as the threaded nut moves along the threaded rotating shaft as the threaded rotating shaft is driven by the electric motor.

13. The tool changer of claim 9 wherein the rotating shaft is driven by the electric motor, and has two oppositely-threaded portions, and further comprising:
    a threaded nut threaded onto each rotating shaft threaded portion; and
    a connecting rod connected to each threaded nut and pivotally connected to the piston, the connecting rods operative to displace the piston between a retracted, decoupled position and an extended, coupled position as the rotating shaft rotates.

14. The tool changer of claim 13 wherein, as the electric motor turns the rotating shaft in one direction, each threaded nut moves outwardly towards a respective end of the rotating shaft, and the connecting rods move the piston towards the retracted, decoupled position, and as the electric motor turns the rotating shaft in the opposite direction, each threaded nut moves inwardly towards the center of the shaft, and the connecting rods move the piston towards the extended, coupled position.

15. The tool changer of claim 9 wherein the coupling mechanism comprises:
    a gear driven by the electrical motor and having a plurality of cam followers protruding from the inner surface; and
    a piston shaft connected to the piston and having a corresponding plurality of variable helix cam grooves formed on the outer surface thereof, the shaft having a non-circular central bore formed axially therein; and
    a non-circular spline post rigidly attached to the first unit and shaped to mate with the piston shaft bore and operative to prevent rotational motion of the piston shaft;
    wherein the shaft is disposed over the spline post and within the driven gear, with a cam follower disposed in each variable helix cam groove, so as to displace the piston between a retracted, decoupled position and an extended, coupled position as the driven gear rotates; and
    wherein the rotating shaft is connected to the motor and has worm threads engaging the driven gear, such that the gear is driven by the electrical motor via the rotating shaft.

16. The tool changer of claim 1:
    wherein the coupling mechanism comprises a locking shaft having a plurality of thread ledge lobes disposed radially around the shaft, each thread ledge lobe comprising a plurality of thread ledges arranged in an axial orientation on the locking shaft; and
    further comprising a corresponding plurality of thread shelf sets disposed radially around an interior annular surface of a cavity formed in the second unit, each thread shelf set comprising a plurality of thread shelves arranged in an axial orientation.

17. The tool changer of claim 16 wherein, in the decoupled position of the locking shaft, the thread ledge lobes align with spaces between the thread shelf sets, allowing the first and second units to decouple, and in the coupled position of the locking shaft, the thread ledges engage with the thread shelves, coupling the first and second units together.

18. The tool changer of claim 17 wherein the locking shaft includes three thread ledge lobes disposed substantially evenly around the circumference of the locking shaft.

19. The tool changer of claim 17 further comprising:
    a motor output shaft having worm threads, the motor output shaft driven by the electric motor;
    a worm gear coupled to the locking shaft and engaging the motor output shaft worm threads such that as the motor drives the motor output shaft, the worm gear rotates the locking shaft.

20. A robotic tool changer, comprising:
    a first unit operative to be attached to one of a robot and a robotic tool;
    a second unit operative to be attached to the other of the robot and a robotic tool, and further operative to be selectively coupled to and decoupled from the first unit;
    a coupling mechanism at least partially protruding from the first unit along a first axis and operative to engage within a recess in the second unit and to selectively couple the first and second units in a coupled position and to allow the first and second units to decouple in a decoupled position;

wherein the coupling mechanism comprises
- a plurality of rolling members disposed in the one of the units;
- a piston disposed in the first unit, the piston selectively movable longitudinally along the first axis between a retracted, decoupled position and an extended, coupled position, the piston having at least one tapered surface operative to displace the rolling members outwardly of the piston axis as the piston moves from the decoupled to the coupled position; and
- at least one angled surface in the second unit operative to lock the first and second units together when the rolling members are forced against the angled surface by a tapered piston surface;
- a gear driven by the electrical motor and having a plurality of cam followers protruding from the inner surface; and
- a piston shaft connected to the piston and having a corresponding plurality of variable helix cam grooves formed on the outer surface thereof, the shaft having a non-circular central bore formed axially therein; and
- a non-circular spline post rigidly attached to the first unit and shaped to mate with the piston shaft bore and operative to prevent rotational motion of the piston shaft;
- wherein the shaft is disposed over the spline post and within the driven gear, with a cam follower disposed in each variable helix cam groove, so as to displace the piston between a retracted, decoupled position and an extended, coupled position as the driven gear rotates;
- an electric motor operative to drive the coupling mechanism between coupled and decoupled positions; and
- a belt member coupling the gear to the electric motor.

21. A robotic tool changer, comprising:
- a tool unit operative to attach to a robotic tool and including a generally circular chamber;
- a master unit operative to attach to a robot, and to selectively couple to and decouple from the tool unit;
- an annular collar on the master unit, having a plurality of holes formed therethrough;
- a plurality of ball members disposed within the holes;
- a piston having at least one tapered surface disposed in the master unit, the piston operative to urge the ball members radially outward of the collar as piston moves from a retracted, decoupled position to an extended, coupled position along a first axis;
- an electric motor;
- a coupling mechanism operative to selectively move the piston between decoupled and coupled positions in response to the electric motor;
- a rotating shaft coupling the motor to the coupling mechanism, the rotating shaft disposed along a second axis perpendicular to the first axis; and
- an angled surface in the tool unit chamber opposite each collar hole when the master and tool units are abutted, the angled surface operative to direct a component of the force applied to it by the ball members towards the master unit.

22. The tool changer of claim 21 wherein the at least one tapered surface comprises:
- a tapered locking surface;
- an initial actuating surface; and
- a failsafe surface interposed between said tapered locking surface and said initial actuating surface.

23. The tool changer of claim 21 wherein the rotating shaft is connected to the electric motor, and includes worm threads, and further comprising:
- a worm gear disposed coaxially with the piston, constrained in the axial direction, and having a threaded inner surface, the worm gear coupled to the rotating shaft worm threads; and
- a threaded shaft connected to the piston, the threaded shaft coupled to the threaded inner surface of the worm gear.

24. The tool changer of claim 21 wherein the rotating shaft is threaded and is connected to the electric motor, and further comprising:
- a threaded nut threaded onto the threaded rotating shaft; and
- a scissors linkage connected to the threaded nut and operative to displace the piston between a retracted, decoupled position and an extended, coupled position as the threaded nut moves along the threaded rotating shaft as the threaded rotating shaft is driven by the electric motor.

25. The tool changer of claim 21 wherein the rotating shaft is driven by the electric motor, and has two oppositely-threaded portions;
- a threaded nut threaded onto each rotating shaft portion; and
- a connecting rod connected to each threaded nut and pivotally connected to the piston, the connecting rods operative to displace the piston between a retracted, decoupled position and an extended, coupled position as the rotating shaft rotates.

26. The tool changer of claim 21 wherein the coupling mechanism comprises:
- a gear driven by the electrical motor and having a plurality of cam followers protruding from the inner surface; and
- a piston shaft connected to the piston and having a corresponding plurality of variable helix cam grooves formed on the outer surface thereof, the shaft having a non-circular central bore formed axially therein; and
- a non-circular spline post rigidly attached to the first unit and shaped to mate with the piston shaft bore and operative to prevent rotational motion of the piston shaft;
- wherein the shaft is disposed over the spline post and within the driven gear, with a cam follower disposed in each variable helix cam groove, so as to displace the piston between a retracted, decoupled position and an extended, coupled position as the driven gear rotates; and
- wherein the rotating shaft is connected to the motor and has worm threads engaging the driven gear, such that the gear is driven by the electrical motor via the rotating shaft.

27. A robotic tool changer, comprising:
- a first unit operative to be attached to one of a robot and a robotic tool;
- a second unit operative to be attached to the other of the robot and a robotic tool, and further operative to be selectively coupled to and decoupled from the first unit along a first axis;
- an electric motor;
- means for selectively coupling the first and second units in a coupled position and to allow the first and second units to decouple in a decoupled position under the power of the electric motor; and
- a rotating shaft disposed along a second axis perpendicular to the first axis, the rotating shaft coupling the electric motor to the coupling means.

* * * * *